United States Patent [19]

Zanoni

[11] 4,169,980

[45] Oct. 2, 1979

[54] METHOD AND APPARATUS FOR INTERFERENCE FRINGE CENTER SENSING

[75] Inventor: Carl A. Zanoni, Middletown, Conn.

[73] Assignee: Zygo Corporation, Middlefield, Conn.

[21] Appl. No.: 898,832

[22] Filed: Apr. 21, 1978

Related U.S. Application Data

[63] Continuation-in-part of Ser. No. 788,736, Apr. 19, 1977, abandoned.

[51] Int. Cl.² ............................................. G02B 27/38
[52] U.S. Cl. .................................. 250/550; 356/345; 358/107
[58] Field of Search ............... 356/345; 250/550, 216, 250/560, 561, 237 G; 358/107

[56] References Cited

U.S. PATENT DOCUMENTS

| 3,409,375 | 11/1968 | Hubbard | 358/106 |
| 3,644,046 | 2/1972 | Ryan | 358/93 |
| 3,694,088 | 9/1972 | Gallagher et al. | 356/106 |
| 3,907,439 | 9/1975 | Zanoni | 250/560 |
| 3,967,054 | 6/1976 | Walton | 358/107 |
| 3,967,903 | 7/1976 | Enami et al. | 356/167 |
| 3,980,870 | 9/1976 | Kawahara | 358/107 |

OTHER PUBLICATIONS

"The Rapid Measurement of Photographic Records of Interference Fringes", J. Dyson, *Appl. Optics*, V. 2, pp. 487–489 (1963).

"A Method for the Precise Evaluation of Interferograms", G. D. Dew, *J. Sci. Instr.*, vol. 41, pp. 160–162 (1964).

"An Automated Interferogram Technique", Jones et al., App. Optics, vol. 7, pp. 1477–1482 (1968).

"Analysis of Interferograms", R. Berggren, Optical Spectra, pp. 22–25 (1970, Dec.).

IBM Tech. Disclosure Bulletin, vol. 20, No. 1, Jun. 1977, pp. 206–214.

"Interferometry", C. Zanoni, *The Optical Industry and Systems Directory Encyclopedia*, vol. 2, pp. E137–E141 (1977).

*Primary Examiner*—David C. Nelms
*Attorney, Agent, or Firm*—Milton Zucker

[57] ABSTRACT

An electro-optical sensor is described which provides an output for precisely locating the centers of interference fringes in either a real-time interference pattern or an interferogram. By scanning the fringe pattern either by moving the fringe pattern, by effectively moving the photoelectric sensor, or both, the centers of the fringes can be rapidly and precisely determined from the first derive of the output of the photodetector.

3 Claims, 7 Drawing Figures

2

METHOD AND APPARATUS FOR INTERFERENCE FRINGE CENTER SENSING

RELATED APPLICATIONS

This application is a continuation in part of my application Ser. No. 788,736 filed Apr. 19, 1977, now abandoned.

BACKGROUND OF THE INVENTION

1. Field of the Invention

The present invention relates to apparatus for the rapid and accurate determination of the center of interference fringes commonly encountered in optical metrology. Specifically, the apparatus determines the center of a fringe when the fringe pattern and a photoelectric sensor are scanned relative to each other. More particularly, the invention relates to noncontacting electro-optical apparatus for this type of determination which is capable of rapidly and accurately measuring the coordinates of fringe centers in either a real-time interference pattern or an interferogram.

Inteferometric testing has long been used in optical metrology. The advent of the laser has not only made interferometers more convenient to use but has also extended their range of application. Interferometry is used as a tool in optical fabrication, final testing, and system alignment, see for example, C. Zanoni, "Interferometry," *The Optical Industry and Systems Directory Encyclopedia,* v. 2, pp. E137–E141 (1977).

For most interferometric measurements, the information is contained in either a real-time inteference fringe pattern or an interferogram, i.e., a photograph of an interference pattern. The quantitative usefulness of an interference pattern is dependent upon having a method of data extraction and reduction. For a preliminary evaluation, positional deviations of the fringes can be obtained using a variety of simple manual techniques, see, for example, R. Berggren, "Analysis of Interferograms," *Optical Spectra,* pp. 22–25 (December 1970).

In order to extract information from either a real-time interference pattern or an interferogram for a more thorough evaluation, it is necessary to know the two-dimensional coordinates for an array of points located on the centers of the fringes.

The measurement of fringe centers on interferograms has been carried out using a variety of techniques. Most of the techniques use mechanical scanning to produce photoelectric signals whose equality is the signature for the location of a fringe center, see, for example, G. D. Dew, "A Method for the Precise Evaluation of Interferograms," J. Sci. Instr. 41, pp. 160–162 (1964) and J. Dyson, "The Rapid Measurement of Photographic Records of Interference Fringes," Appl. Opt. 2, pp. 487–489 (1963). Such fringe scanning techniques are capable of measuring fringe displacements of less than 0.01 fringe.

Another approach used with interferograms locates the center of the optical density curve by using a computer-generated fit to the output of a microdensitometer trace across a fringe, see, for example, R. A. Jones and P. L. Kadakia, "An Automated Interferogram Technique," Appl. Opt. 7, pp. 1477–1482 (1968). A microdensitometer is capable of measuring fringe displacement somewhat more accurately than 0.01 fringe.

Another technique used in an instrument manufactured by the assignee of this application is based upon using an oscillating spot of light to measure optical density gradients on an interferogram. The signature for sensing the location of an interference fringe center is the null in the first derivative of the optical density. Using an oscillating spot of light and synchronous demodulation leads to a considerably simpler instrument which achieves improved precision in the location of fringe centers with a minimum of equipment. However, this technique is extremely slow and, therefore, lends itself only to the measurement of interferograms. Furthermore, it is costly and difficult to automate this approach.

In order to measure real-time interference patterns without introducing errors and complexity, it is desirable to extract all of the fringe center data very rapidly, i.e., in a small fraction, 1/30–1/60, of a second, because of the fluctuations induced in the pattern by mechanical vibrations and atmospheric turbulence effects.

Sophisticated, expensive interferometers have been designed and built for the high precision, automatic reduction of real-time interference patterns. One such instrument is disclosed in Gallagher, et al., U.S. Pat. No. 3,694,088 issued Sept. 26, 1972. Another sophisticated digital interferometer is discussed in J. H. Bruning, et al., "Digital Wavefront Measuring Interferometer for Testing Optical Surfaces and Lenses," Appl. Opt. 13, pp. 2693–2703 (1974). These instruments, however, cannot reduce interferograms.

While these prior-art techniques for sensing the coordinates of the centers of fringes are useful for some applications, they cannot be used for many industrial applications. For example, in the manufacture of high precision, high volume optical components, interferograms and interferometer interference patterns must be measured in large numbers and at high speed with affordable instrumentation.

In my copending application Ser. No. 788,736 filed Apr. 19, 1977, I provide an apparatus for measuring interferograms comprising (1) a source of radiant energy either in the form of a beam of light containing an interference pattern or as illumination for an interferogram, (2) means for scanning the interference pattern, (3) means for collecting and photosensing the radiant energy, and (4) means for processing the photosensor outut to produce a signature indicating the center of a fringe accurately by defining the occurrence of a dark (or bright) fringe center as the instant at which the first derivative of the photosensor output is zero and, simultaneously, the magnitude of the second derivative of the photosensor output is negative (or positive) and below (or above) a preset threshold, and providing means to perform the necessary computations.

In working with this device, I discovered that the noise and time delays involved in using the second derivative presented very serious reliability and speed problems. It is desirable to sense the fringe centers reliably in a totally automatic manner. Moreover, with real-time fringe patterns, it is desirable to complete the operation in the time interval of one TV field, i.e., 1/60 second.

OBJECT OF THE INVENTION

It is the principal object of this invention to provide an improved apparatus for sensing rapidly and precisely the centers of fringes on both real-time interference patterns and on interferograms.

STATEMENT OF THE INVENTION

In accordance with the instant invention, I provide (1) a source of radiant energy either in the form of a beam of light containing a real-time interference pattern or as illumination for an interferogram, (2) means for scanning the interference pattern, (3) means for collecting and photosensing the radiant energy, and (4) means for processing the photosensor output to produce a signature indicating the center of a fringe accurately by defining the occurrence of a dark (or bright) fringe center as the instant at which the first derivative of the photosensor output is zero and, simultaneously, the magnitude of the delayed first derivative of the photosensor output is negative (or positive) and more negative than (or more positive than) a preset negative (or positive) threshold, and providing means to perform the necessary computations. Most desirably, the interference pattern and the locations of the centers sensed are displayed on the screen of a closed circuit television monitor, so that an operator can note any anomalies and can make adjustments accordingly.

THE DRAWINGS

In the drawings,

FIG. 3(b) shows the first derivative of the signal in 3(a).

FIG. 5(b) shows the first derivative of the signal in 5(a).

DETAILED DESCRIPTION OF THE INVENTION

Figure 1:
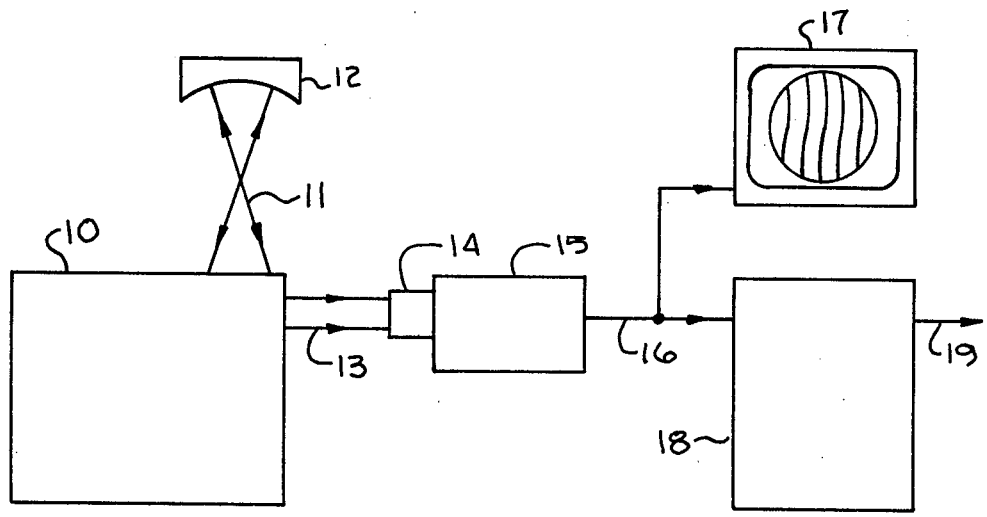
FIG. 1 is a pictorial view illustrating an embodiment of the invention applied to the interference pattern from an interferometer.

Description and Explanation of FIG. 1

The principal components of one embodiment of the invention are illustrated in FIG. 1. In FIG. 1 the measurement beam (11) of the interferometer (10) impinges on the article under test (12). The output of the interferometer (10) is a beam of light (13) which provides the interference fringe pattern. This interference fringe pattern contains information about the test parameters as well as the article under test. The interference pattern on light beam (13) can be processed in a variety of ways. For example, it can be viewed by inserting a ground-glass screen into the beam (13). If a permanent record of the interference pattern is desired, a photograph can be made of the light beam (13). Preferably, the light beam (13) can be imaged by a lens (14) onto the photosensitive surface of a closed circuit television camera (15) whose video output (16) can be connected with coaxial cable to a closed circuit video monitor (17). In this way, the interference fringe pattern appears on the screen of the video monitor (17) as a realtime pattern. The closed circuit television camera and the video monitor can be any of the standard commercially available monochrome models in general use. The only technical requirement is a tolerance on the permissible geometrical distortion in the lens (14) and the camera (15) based on the system accuracy desired.

In the present invention, an interference pattern is scanned by the vidicon in the CCTV camera (15). The fringes in the interference pattern are oriented so that they are nominally perpendicular to the scan lines. The video output (16) of the CCTV camera (15) provides the input to the fringe center sense unit (18). The output (19) of unit (18) is a pulse whose leading or trailing edge is the signature indicating precisely when the scan passes over a fringe center.

Figure 2:
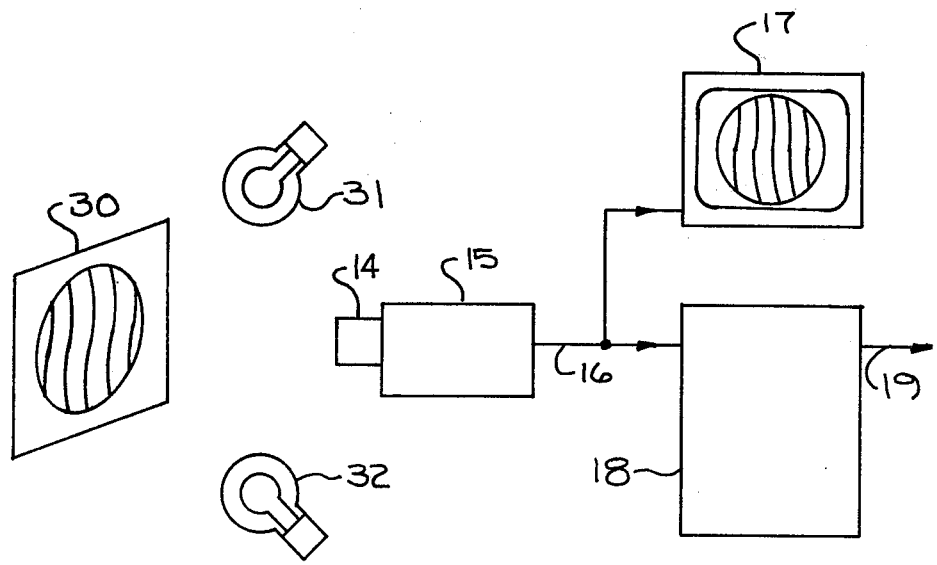
FIG. 2 is a pictorial view illustrating an embodiment of the invention applied to an interferogram.

Description and Explanation of FIG. 2

FIG. 2 illustrates use of the present invention with a photograph of an interference pattern. The interferogram (30) is a photograph of an interference fringe pattern. Light sources (31) and (32) provide radiant energy to illuminate the interferogram (30). Lens (14) images (30) onto the photosensitive surface of CCTV camera (15). The remainder of the apparatus functions in accordance with the description provided for FIG. 1.

Figure 3:
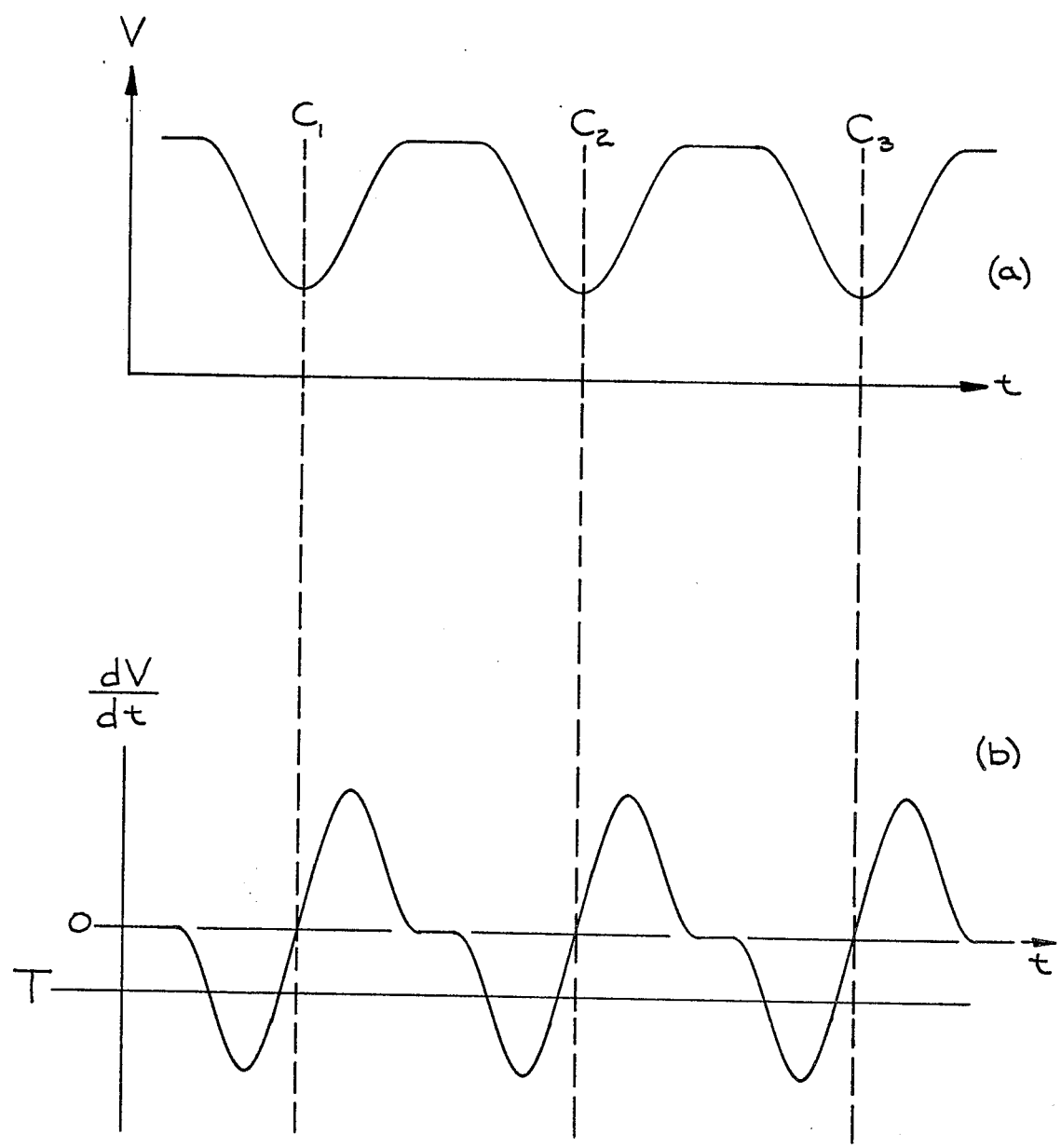
FIG. 3 (a) shows a simplified signal of a typical CCTV camera video output for a single scan line across an interference pattern on an interferogram with no indication of the noise which accompanies all such signals.
Figure 4:
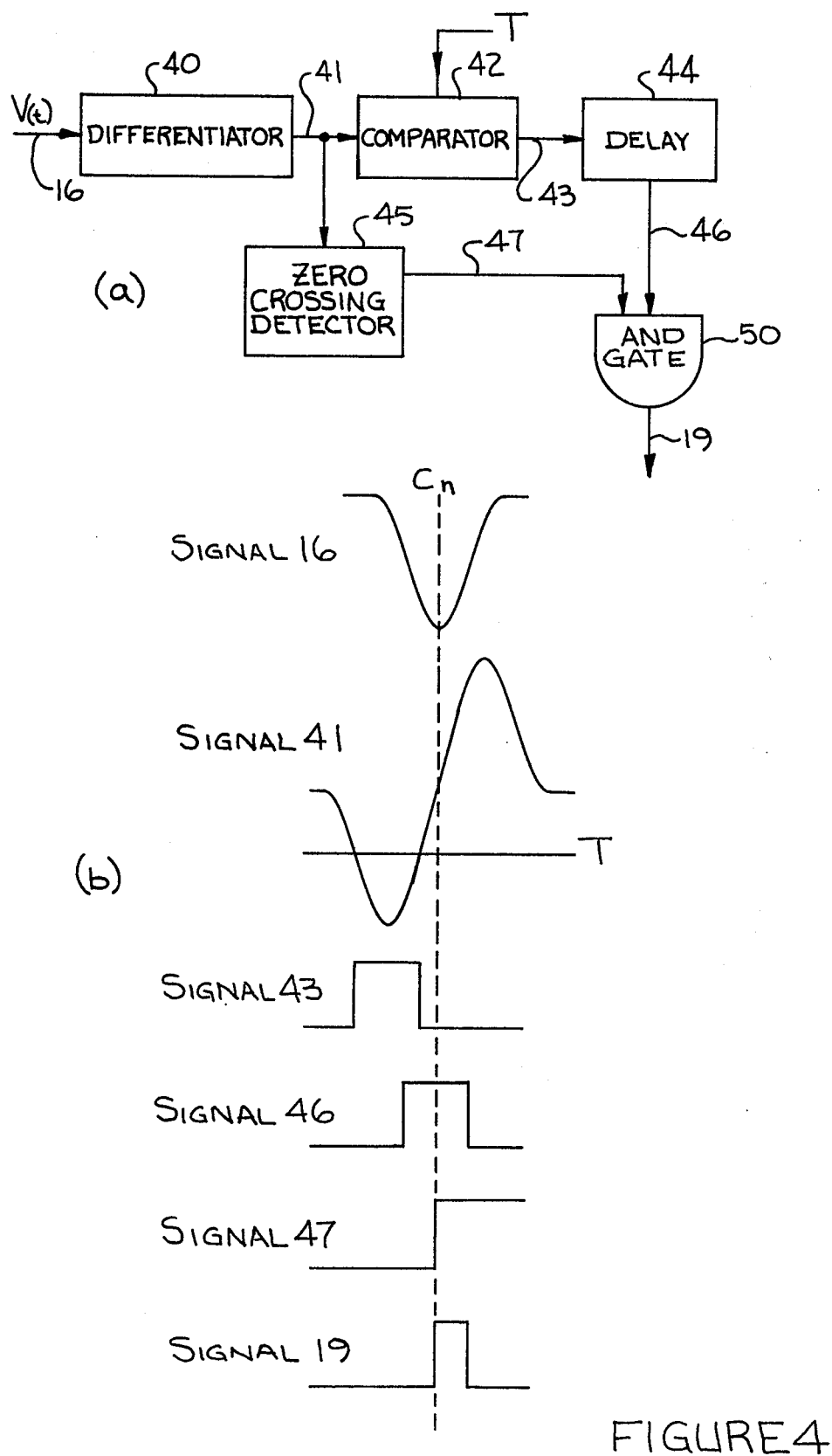
FIG. 4 is a schematic block diagram of the circuitry used to sense a fringe center.

Description and Explanation of FIGS. 3 and 4

Referring to FIG. 3, the output (16) of the CCTV camera (15) for a single scan line across an interference pattern on an interferogram yields a signal similar to that shown in FIG. 3(a). In FIG. 3(a), the ordinate labeled V is the voltage level of signal (16), and the abscissa t corresponds to time. In FIG. 3(a), the flat maxima result from improper exposure, reciprocity failure in the film, or both. For real-time interference patterns, the flattening of the maxima is not nearly as pronounced as it is in interferograms. Nevertheless, since any nonuniformity of illumination in the interfering light beam can cause a spurious shift in the centers of the interference maxima, it is preferable not to use the centers of the bright fringes for either real-time patterns or interferograms. It can be shown mathematically that the centers of the dark fringes i.e., where destructive interference takes place, do not experience this spurious shift. The maxima and minima in the 3(a) curve correspond to the constructive (bright) and destructive (dark) interference fringes, respectively. $C_1$, $C_2$, and $C_3$ (collectively $C_n$) are the centers of three dark fringes. It is necessary to determine the points $C_1$, $C_2$, and $C_3$ with high precision and at high speed if good accuracy and resolution are to be obtained.

I determine the points $C_n$ of the dark fringes precisely and rapidly by means of the techniques illustrated in FIGS. 3 and 4. If the photosensor output (16), curve 3(a), is differentiated to produce dV/dt, we get curve 3(b). This differentiation can be done with conventional circuitry. The signal in curve 3(b) crosses zero at the points $C_n$ on curve 3(a) since the rate of change of V(t) is zero at $C_n$.

By using the output of the first differentiator, I am able to pinpoint precisely and rapidly the centers of the dark fringes as shown in FIG. 4.

It should be noted, however, that the signal 3(a) and its derivative 3(b) are not as smooth as shown in the simplified drawing. Noise from various sources, primarily artifacts in the interference pattern, produce spurious zero crossings in the first derivative, curve 3(b), which must be discriminated against. This is done in the instant invention by the methods shown in FIG. 4.

The CCTV camera output signal (16), curve 3(a) passes into a differentiator (40) to produce a first derivative signal (41), curve 3(b). This first derivative signal (41) is then supplied to two other circuits: (1) to a comparator (42) and (2) to a zero crossing detector (45). The zero crossing detector (45) changes state when the first derivative signal (41) goes through zero volts. The output (43) of the comparator (42) switches when the first derivative signal (41) goes below a fixed threshold T, see FIG. 3(b). T is a preset negative voltage which can be adjusted as desired by the operator. Since the output (43) of the comparator (42) comes before the zero crossing of the first derivative signal (41) a delay (44) is added so the delayed output of the comparator pulse (46) is now centered on the zero crossing signal (47). This delayed pulse (46) and the output (47) of the zero crossing detector (45) are ANDED together with the AND gate (50) to form a pulse (19) whose positive going edge corresponds to the center of a dark fringe.

By using only the portion of signal in FIG. 3(b) which is more negative than the negative threshold voltage T, spurious zero crossings which occur over a large portion of the signal are eliminated. By adjusting the threshold voltage T, the width of pulse (43) can be adjusted, so that the level of discrimination can be adjusted to the particular signal under test.

The threshold T is used with the first derivative signal rather than with the video signal itself because the dc level of the video signal can vary quite arbitrarily from either changes in the background illumination or changes in the line voltage.

Figure 5:
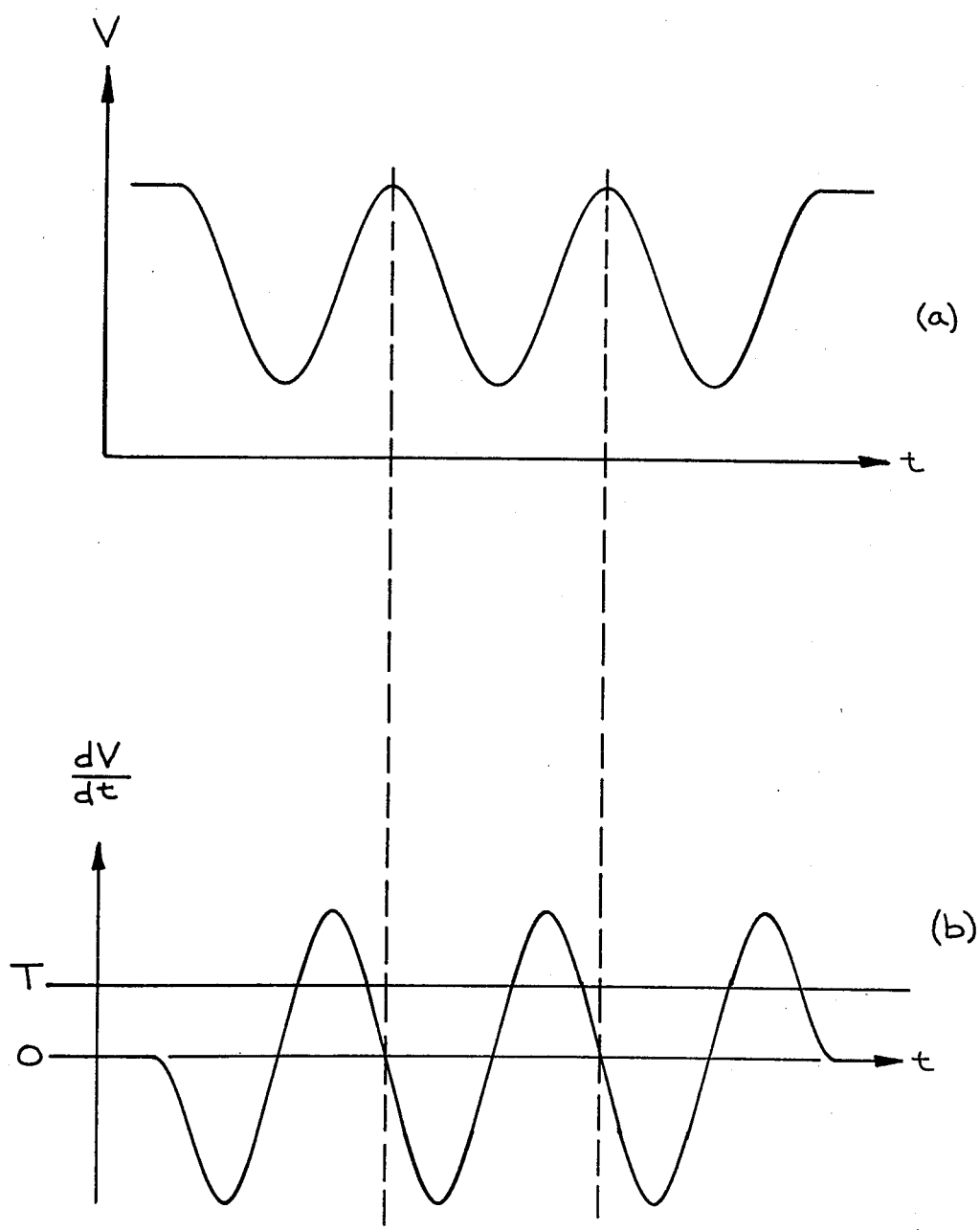
FIG. 5 (a) shows a typical CCTV camera video output signal for a single scan line across a real-time interference pattern with well defined maxima.

Description and Explanation of FIG. 5

FIG. 5(a) shows the curve obtained for a typical CCTV camera video output signal for a single scan line across a real-time interference pattern where the maxima are not saturated, and, therefore, not flat; FIG. 5(b) shows the first derivative signal for such a case. It is possible, with such curves, to use the maxima instead of the minima in sensing fringe centers. This is done by setting the threshold T at a positive voltage instead of at the negative voltage which is used to sense the centers of the minima.

While a preferred embodiment of the invention has been disclosed, obviously modification can be made therein, without departing from the scope of the invention as defined in the following claims.

What is claimed is:

1. An apparatus for rapidly locating the centers of fringes in an interference pattern comprises (1) means for providing a beam of light containing an interference pattern consisting of alternate bright and dark fringes, (2) means for scanning said interference pattern, (3) means for collecting and photosensing said beam of light, (4) means for processing the output of said photosensing means to obtain a signature indicating the centers of said fringes which comprises (5) means for differentiating the output of said photosensing means to obtain a first derivative signal which derivative is zero at the points at which the bright fringes are maxima and at which the dark fringes are minima, and (6) means for applying to said first derivative signal a threshold voltage adjustable to a preselected value, which is close to the maximum of said first derivative signal when bright fringes are being measured and to the minimum of said first derivative signal where dark fringes are being measured to produce a pulse whose width is equal to the time interval during which the first derivative signal is more positive than said positive threshold voltage in the case of bright fringes and more negative than said negative threshold voltage in the case of dark fringes, (7) means for delaying said pulse and (8) means for producing a signal indicating a fringe center only when said first derivative signal is zero and falls within said delayed pulse whereby spurious zeros due to noise are largely eliminated.

2. The apparatus of claim 1, in which a closed circuit television camera is the means for scanning said interference pattern.

3. The apparatus of claim 1, in which a real-time interference pattern is being measured on a closed circuit television monitor, and the dark fringes are used, and the centers are determined within the time required for scanning a single television field.

* * * * *